United States Patent [19]

Partridge

[11] 4,240,608
[45] Dec. 23, 1980

[54] CONTROLLED FLOAT SEAT ARRANGEMENT FOR EXPANDING GATE VALVES

[75] Inventor: Charles C. Partridge, Houston, Tex.

[73] Assignee: ACF Industries, Incorporated, New York, N.Y.

[21] Appl. No.: 90,761

[22] Filed: Nov. 2, 1979

[51] Int. Cl.³ ............................................. F16K 25/00
[52] U.S. Cl. .................................... 251/167; 251/196; 251/328
[58] Field of Search ............... 137/315, 327; 251/167, 251/195, 196, 328

[56] References Cited

U.S. PATENT DOCUMENTS

| 3,334,653 | 8/1967 | Works | 251/328 X |
| 3,768,774 | 10/1973 | Baugh | 251/196 X |
| 4,179,098 | 12/1979 | Laitkep | 251/196 X |
| 4,188,016 | 2/1980 | Whaley | 251/328 |
| 4,193,581 | 3/1980 | Eilers | 251/328 |

Primary Examiner—Harold W. Weakley
Attorney, Agent, or Firm—Stephen T. Belsheim

[57] ABSTRACT

An expanding gate valve having a pair of seat spacers (70) which hold apart a pair of floating valve seats (32) to prevent them from binding against a gate mechanism (40) which is collapsed for movement between open and closed positions. The spacers (70) are cylindrical segments which fit in the valve chamber of a gate valve having a cylindrical body cavity (20).

7 Claims, 7 Drawing Figures

CONTROLLED FLOAT SEAT ARRANGEMENT FOR EXPANDING GATE VALVES

BACKGROUND OF THE INVENTION

This invention relates generally to gate valves and deals more particularly with an improved controlled float seat construction for expanding gate valves.

In a typical expanding gate valve, the gate mechanism expands tightly against the valve seats in both the fully open and fully closed positions of the valve. To facilitate movement between the open and closed positions, the gate mechanism collapses or contracts for the purpose of preventing the seats from dragging against it. However, since the seats are often mounted rather loosely in order to accommodate manufacturing tolerances and other imperfections in the sealing surfaces, the seats are able to "float" inwardly and bind against the collapsed gate assembly. Such binding action of the seats significantly increases the operating torque of the valve and the wear on the components, particularly the sealing surfaces. In order to avoid this problem, various types of limited or controlled float seats have been proposed, including the arrangement shown in U.S. Pat. No. 3,823,911 to Natho et al.

Although seat spacers such as those disclosed in the Natho et al patent are satisfactory for the most part, they are not wholly without problems. Most notably, a large body cavity is required to accommodate the spacers due to their size and shape and their manner of cooperation with the valve seats. Therefore, the valve body must be larger than is desirable and the cost of the valve increases accordingly. The spacers that have been proposed in the past are also ill suited for use in cylindrical body cavities which in many situations have significant advantages over other shapes.

SUMMARY OF THE INVENTION

The present invention is directed to an improved arrangement for controlling the floating movement of valve seats in an expanding gate valve. It is the primary object of the invention to limit the float of the seats in a simplified manner while minimizing the size of the valve body. In accordance with the invention, a pair of spacers are mounted between a pair of floating valve seats. The length of the spacers is such that the seats cannot move inwardly toward one another far enough to bind against the collapsed gate assembly. The spacers ae each in the shape of a segment of a cylinder so that they can be readily installed in a valve body having a cylindrical cavity. The size of the valve is thus reduced in comparison to valves employing the types of spacers that have been proposed in the past. The unique arrangement of the seats and spacers avoids the need for close tolerances or difficult machining operations.

BRIEF DESCRIPTION OF THE DRAWINGS

In the accompanying drawings which form a part of the specification and are to be read in conjunction therewith.

DETAILED DESCRIPTION OF THE INVENTION

Figures 1, 2:
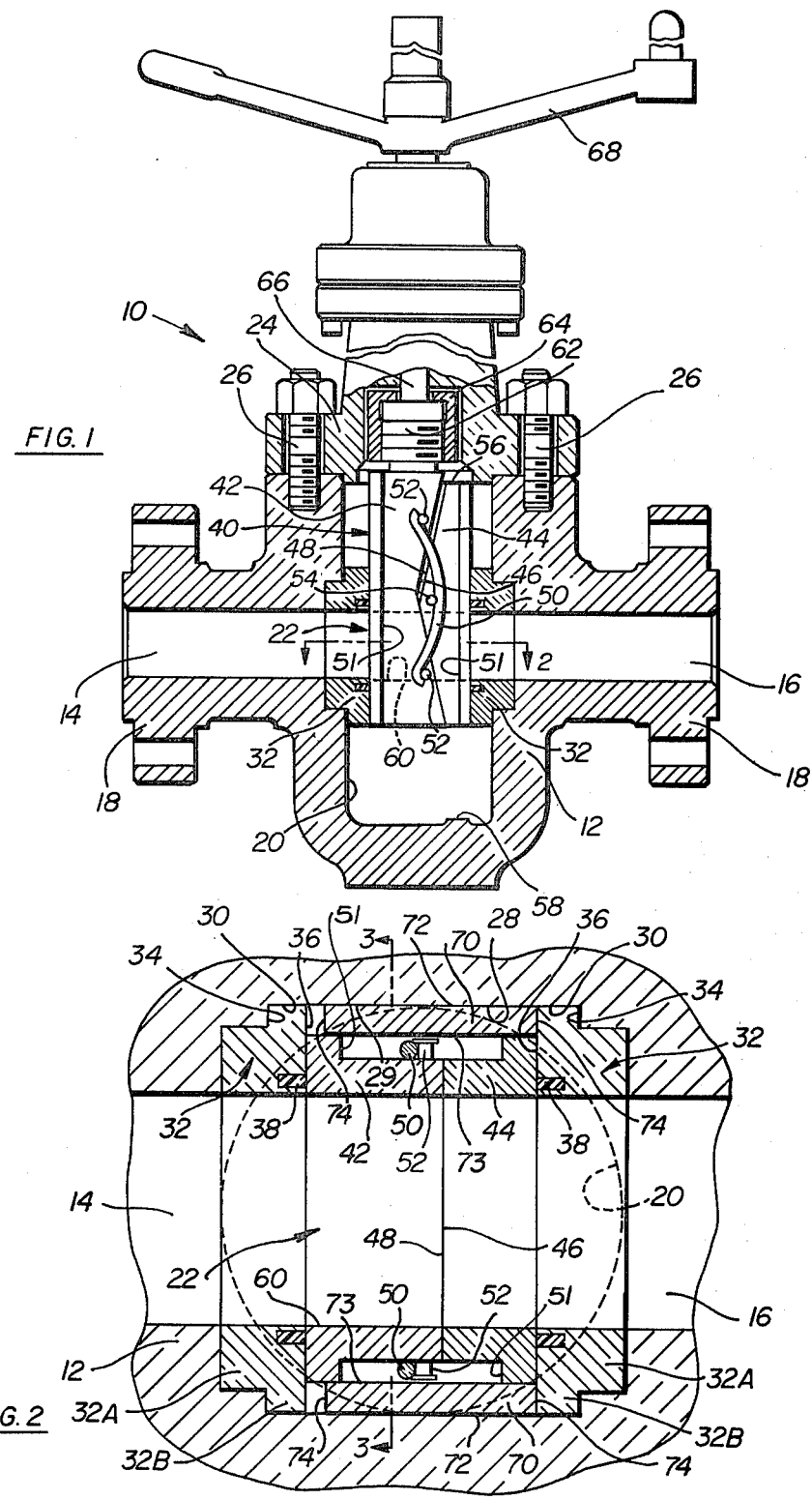
FIG. 1 is a sectional view of an expanding gate valve constructed according to a preferred embodiment of the present invention, with the upper portion of the valve shown in elevation and the gate mechanism in the fully open position.
FIG. 2 is a fragmentary sectional view on an enlarged scale taken generally along line 2—2 of FIG. 1 in the direction of the arrows.

With initial reference to FIG. 1, numeral 10 generally designates an expanding gate valve constructed in accordance with the present invention. Valve 10 includes a valve body 12 having a flow passage formed by an inlet passage 14 and an outlet passage 16. Passages 14 and 16 are cylindrical and are in alignment with one another. Flanges 18 are formed on opposite ends of the valve body to facilitate connection with a fluid flowline. A cylindrical body cavity 20 is formed in body 12 and intersects at a right angle with the flow passage of the valve in a manner to define a valve chamber 22 in the valve body between inlet passage 14 and outlet passage 16.

Body cavity 20 extends to the top of valve body 12 and is covered by a bonnet 24 which is secured to the top of valve body 12 by a plurality of bolts 26. As best shown in FIG. 2, the flow passage of the valve has a central cylindrical portion 28 which is enlarged relative to the remainder of the flow passage. Portion 28 of the flow passage is located between inlt passage 14 and outlet passage 16 and intersects with body cavity 20 to define the valve chamber 22. Portion 28 is bounded by a cylindrical surface 29 which is formed internally of valve body 12. A pair of annular seat pockets 30 are formed about the flow passage at opposite ends of cylindrical portion 28 adjacent opposite ends of the valve chamber. Each pocket 30 has a stepped configuration and opens to valve chamber 22. Mounted in each seat pocket 30 is an annular valve seat 32. Each seat 32 has an outwardly extending hub portion 32A and an enlarged inner portion 32B which engages a shoulder portion 34 of seat pocket 30 in order to limit outward movement of the seat. The inside face of each seat 32 is a flat annular surface 36 which forms a sealing surface carrying an annular face seal 38. Each face seal 38 is preferably formed of polytetrafluoroethylene or another substance having similar properties. It is noted that the fit of each valve seat 32 in its seat pocket 30 is sufficiently loose to permit the seats to "float" inwardly toward one another. Each seat 32 has a central opening therein which is the same size and shape as the adjacent passage 14 or 16. Each seat 32 is equipped with a seat skirt 39.

With reference again to FIG. 1, numeral 40 generally designates a expanding gate mechanism which is mounted in body cavity 20 for reciprocal movement between open and closed positions. Gate mechanism 40 includes a gate 42 and a segment 44 having flat outer surfaces which seal against surface 36 of the valve seats and against face seals 38 in both the open and closed positions of the gate assembly. Gate 42 has an inside wedge surface 46 which inclines in opposite directions above and below the center of the gate. Surface 46 interacts in wedging fashion with a similarly inclined wedge surface 48 formed on segment 44. A pair of curved springs 50 continuously urge gate 42 and segment 44 together to a collapsed condition of the gate mechanism. Springs 50 are mounted within recesses 51 formed in the sides of gate 42 and segment 44. The ends of each spring 50 are fitted against a pair of pins 52 which project from each side of the gate 42 within the recess 51. The central portion of each spring 50 engages a pin 54 which projects from each side of segment 44 within the recess. Bonnet 24 provides an upper stop 56 which engages segment 44 in order to limit upward movement thereof. A lower stop 58 formed on valve body 12 limits downward movement of the segment.

In the fully open position of the gate mechanism shown in FIG. 1, gate 42 and segment 44 cooperate to provide a flow port 60 through the gate mechanism which is aligned with inlet passage 14 and outlet passage 16 in order to provide an uninterrupted flow conduit through the valve. Port 60 is out of alignment with the flow passage when gate mechanism 40 is moved to the closed position wherein flow between passages 14 and 16 is blocked. The top end of gate 42 has a threaded projection 62 which recevies an internally threaded nut 64. A valve stem 66 is received at its lower end by nut 64 such that reciprocation of stem 66 causes gate mechanism 40 to move upwardly and downwardly in the usual manner between the open and closed positions of the valve. Stem 66 extends upwardly through bonnet 24 and is equipped at its top end with a handwheel 68 which may be turned to effect axial movement of the stem in the usual manner.

Figure 3:
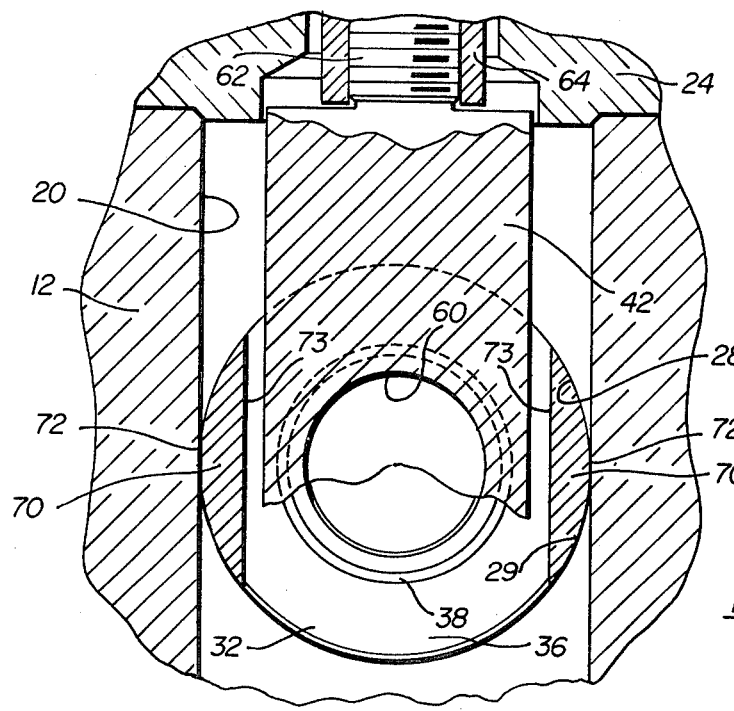
FIG. 3 is a fragmentary sectional view taken generally along line 3—3 of FIG. 2 in the direction of the arrows with the lower portion of the gate broken away for purposes of illustration.
Figure 4:
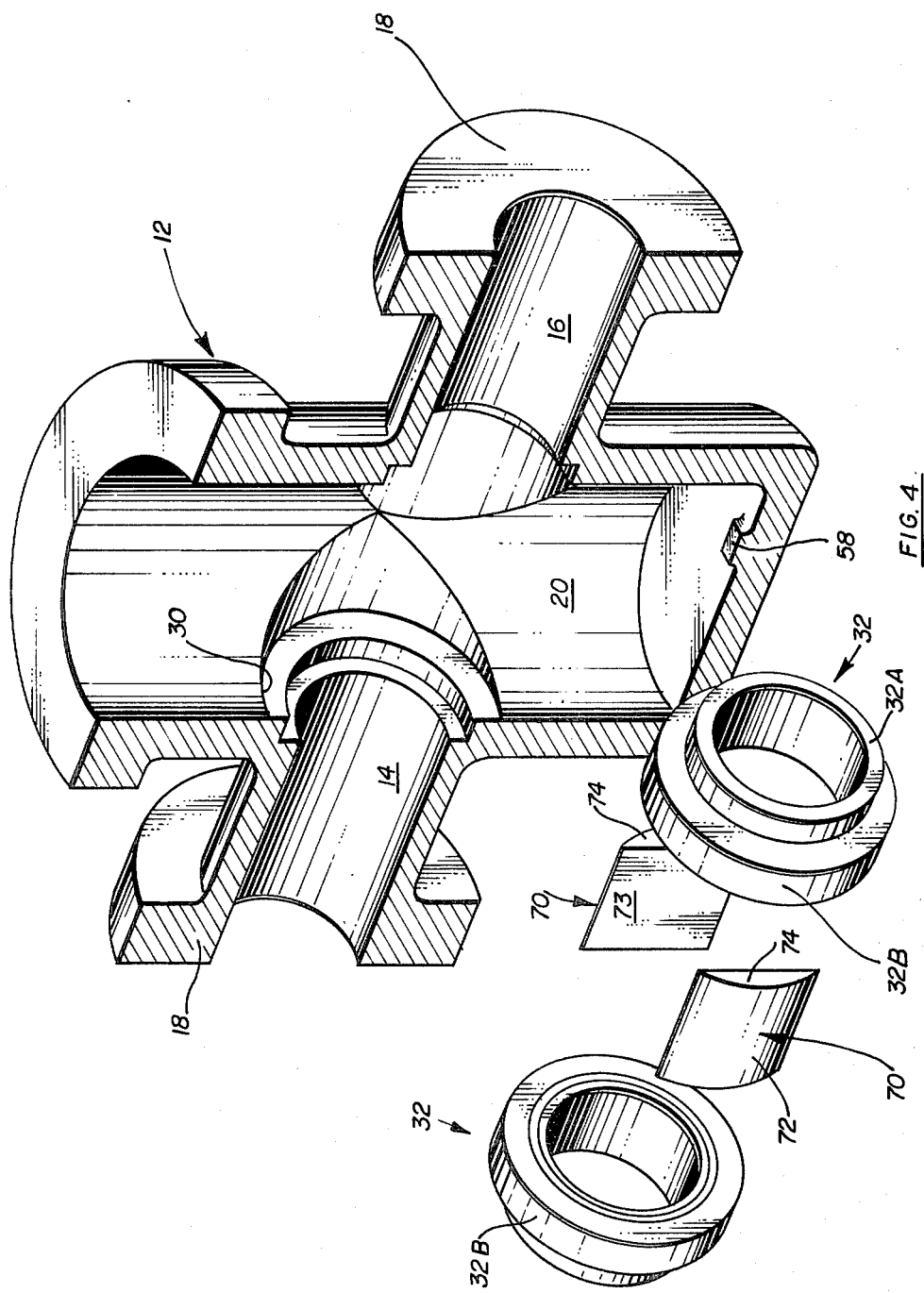
FIG. 4 is a longitudinal sectional view of the valve body shown in FIG. 1, with the seats and the spacers shown removed from the cylindrical body cavity.

With reference again to FIG. 2 in particular, a pair of spacers 70 serve to limit the inward floating movement of valve seats 32. Each spacer 70 is in the shape of a segment of a right circular cylinder having the same curvature as the cylindrical portion 28 of the flow passage of the valve. An arcuate outer surface 72 (see FIGS. 3 and 4) of each spacer 70 has the same curvature as cylindrical portion 28 and is fitted closely against the cylindrical surface 29 which defines the wall of portion 28. Spacers 70 are thus mounted within valve chamber 22 between valve seats 32 and on opposite sides of gate mechanism 40. Each spacer 70 has a flat inside surface 73 located adjacent the side surfaces of gate 42 and segment 44. The length dimension of each spacer 70 is oriented parallel to the flow passage of the valve and is defined between flat opposite ends 74 of the spacer. Spacers 70 are located well outwardly of face seals 38 adjacent the outer peripheries of sealing surfaces 36.

As shown in FIG. 2, when gate mechanism 40 is in the expanded condition, its width in the direction of the flow passage of the valve is greater than the length of spacers 70 between their ends 74. A small gap is thus formed between at least one of the ends 74 and one of the valve seats 32 when the gate mechanism is expanded. Conversely, in the collapsed condition of the gate assembly, its width (the distance between the outside surfaces of gate 42 and segment 44) is less than the length dimension of spacers 70 so that ends 74 can contact surfaces 36 of the valve seats, as will be explained in more detail.

Valve 10 is assembled by installing seats 32 into the top of body 12 through body cavity 20 before bonnet 24 is attached. The diameter of body cavity 20 is at least equal to the diameter of seat pockets 30 so that the seats can be inserted in the manner indicated. After seats 32 have been mounted in their seat pockets 30, spacers 70 are inserted into the top of body cavity 20 with the length dimension of each spacer preferably oriented vertically or parallel to the longitudinal axis of the body cavity. After each spacer 70 has entered valve chamber 22, it is turned 90° such that its length dimension is parallel to the flow passage defined by passages 14 and 16. The arcuate surface 72 of each spacer is then positioned against cylindrical surface 29 in the position shown in FIG. 2. This manner of insertion of spacers 70 avoids scratching seats 32. Gate assembly 40 and the remaining valve components may then be assembled in the usual manner.

In operation of the valve, handwheel 68 is turned in order to reciprocate gate mechanism 40 between the open and closed positions. As the gate mechanism is moved upwardly toward the open position shown in FIG. 1, segment 40 contacts upper stop 56, whereupon continued upward movement of gate 42 causes the lower portions of wedge surfaces 46 and 48 to wedge against one another, thereby expanding gate 42 and segment 44 against sealing sufaces 36 and face seals 38.

Movement of gate mechanism 40 to the closed position is effected by moving the gate mechanism downwardly. Initial downward movement of gate 42 relieves the wedging force between the lower portions of wedge surfaces 46 and 48, and springs 50 then maintain the gate mechanism in its collapsed condition wherein surfaces 46 and 48 are in flush contact along the entire height of the gate assembly. As previously indicated, the width of the gate assembly in the collapsed condition thereof is less than the length of spacers 70. Consequently, ends 74 of spacers 70 contact sealing surfaces 36 of valve seats 32 in order to prevent the valve seats from floating inwardly far enough to bind against the gate or segment. The operating torque of the valve is thus reduced because gate mechanism 40 moves between the open and closed positions without dragging against the valve seats. When the fully closed position of the gate assembly is reached, segment 44 engages stop 58, after which continued downward movement of gate 42 causes the upper portions of wedge surfaces 46 and 48 to wedge against one another in a manner to expand gate 42 and segment 44 against sealing surfaces 36 and face seals 38. When gate mechanism 40 is moved upwardly from the closed position to the open position, spacers 70 act in the manner indicated previously to prevent seats 32 from binding against the collapsed gate mechanism.

It is thus apparent that spacers 70 act effectively to control the floating movement of valve seats 32. The shape of spacers 70 permits them to be readily installed in a valve body having a relatively small body cavity of cylindrical configuration. At the same time, the spacers occupy little room and thus minimize the size of the valve body. It is noted that the spacers are essentially self supporting due to their snug fit in valve chamber 22, and that complicated support arrangements are thus avoided.

What is claimed is:

1. An expanding gate valve comprising:
    a valve body having a substantially cylindrical flow passage and a substantially cylindrical body cavity intersecting with the flow passage to form a valve chamber, said body having a pair of spaced apart seat pockets formed about the flow passage adjacent said valve chamber;
    a pair of annular valve seats mounted in the seat pockets, each seat having an inner surface facing the valve chamber;
    an expanding gate assembly mounted in said body cavity for movement in a collapsed condition between open and closed positions, said gate assembly expanding to an expanded condition in both the open and closed positions to seal against said inner surfaces of the valve seats;

a pair of spacers mounted within the valve chamber on opposite sides of said gate assembly between said seats, said spacers being long enough to engage said inner surfaces of the seats to prevent both valves seats from moving inwardly far enough to contact the gate assembly when same is in the collapsed condition; and an arcuate outer surface of each spacer having a curvature substantially equal to the curvature of the flow passage within the valve chamber, said arcuate surface contacting the valve body within the valve chamber.

2. An expanding gate valve comprising:

a valve body presenting a substantially cylindrical body cavity and inlet and outlet passages cooperating to provide a substantially cylindrical flow passage which intersects said body cavity at a right angle to form a valve chamber between the inlet and outlet passages in communication therewith, said valve chamber being bounded by a substantially cylindrical surface extending in the direction of the flow passage between a pair of annular seat pockets defined in said valve body on opposite sides of the valve chamber;

a pair of annular valve seats mounted in the seat pockets and movable therein toward one another;

an expanding gate mechanism mounted in said body cavity for reciprocating movement therein between open and closed positions relative to the flow passage;

means for expanding the gate mechanism to an expanded condition against said valve seats in both the open and closed positions and means for collapsing the gate mechanism to a collapsed condition inwardly of said valve seats for movement between the open and closed positions; and a pair of spacers mounted against said cylindrical surface of the valve chamber on opposite sides of the gate mechanism for engaging said seats to prevent inward movement of the seats against the gate mechanism in the collapsed condition thereof, each spacer being in the shape of a segment of a cylinder having substantially the same size as said cylindrical surface of the valve chamber.

3. An expanding gate valve as set forth in claim 2, including an annular face seal carried on an inner surface of each valve seat for sealing contact with the gate mechanism when same is in the expanded condition, said spacers engaging the inner surfaces of said valve seats outwardly of said face seal to prevent inward movement of the seats against the gate mechanism in the collapsed condition thereof.

4. An expanding gate valve comprising:

a valve body presenting a flow passage therein having an enlarged central cylindrical portion bounded by a cylindrical surface formed internally of the valve body, said cylindrical portion terminating at opposite ends thereof in a pair of spaced apart seat pockets of annular configuration;

a substantially cylindrical body cavity in said valve body, said cavity intersecting said central cylindrical portion of the flow passage at substantially a right angle to define a valve chamber in said valve body;

a pair of annular valve seats mounted in the seat pockets, each seat having an inwardly facing sealing surface;

an expanding gate assembly mounted in said body cavity for reciprocal movement therein between open and closed positions relative to the flow passage, said gate assembly including a gate and a segment having wedge surfaces which interact in wedging fashion to expand said gate and segment against the valve seats in both the open and closed positions of the gate assembly, said gate and segment collapsing inwardly of the valve seats to a collapsed condition of the gate assembly when same is between the open and closed positions;

a flow port through said gate assembly, said port being aligned with the flow passage in the open position of the gate assembly and misaligned with the flow passage in the closed position of the gate assembly; and a pair of spacers for limiting movement of the valve seats toward one another, each spacer having an arcuate surface conforming in curvature with said cylindrical surface and a length dimension defined between opposite ends of the spacer, said spacers being mounted between the valve seats on opposite sides of the gate assembly with said arcuate surfaces contacting said cylindrical surface and with said length dimensions oriented parallel to the flow passage, said length dimensions of the spacers being sufficient to permit engagement of said opposite ends against said valve seats to prevent inward movement of the seats against the gate and segment in the collapsed condition of the gate assembly.

5. A gate valve as set forth in claim 4, including a face seal carried on the sealing surface of each valve seat, said opposite ends of the spacers being adapted to engage said sealing surfaces outwardly of said face seals to prevent inward movement of the seats against the gate and segment in the collapsed condition of the gate assembly.

6. A gate valve as set forth in claim 4. wherein each spacer is in the form of a segment of a cylinder.

7. A gate valve as set forth in claim 4, wherein:

said gate assembly has a width dimension between outer surfaces of said gate and segment which is greater in the expanded condition of the gate assembly than in the collapsed condition thereof; and the length dimension of each spacer is between the width dimensions of the gate assembly in the collapsed and expanded conditions thereof.

* * * * *